(12) United States Patent
Chapel

(10) Patent No.: US 8,978,888 B2
(45) Date of Patent: Mar. 17, 2015

(54) FLOWER POT CARRIER WITH SUSPENSION TAB

(71) Applicant: Karl Ronald Chapel, Grand Haven, MI (US)

(72) Inventor: Karl Ronald Chapel, Grand Haven, MI (US)

( * ) Notice: Subject to any disclaimer, the term of this patent is extended or adjusted under 35 U.S.C. 154(b) by 0 days.

(21) Appl. No.: 13/716,196

(22) Filed: Dec. 16, 2012

(65) Prior Publication Data

US 2014/0166518 A1    Jun. 19, 2014

(51) Int. Cl.
*B65D 85/52* (2006.01)
*B65D 71/70* (2006.01)
*A01G 9/08* (2006.01)

(52) U.S. Cl.
CPC .............. *B65D 85/52* (2013.01); *B65D 71/70* (2013.01); *A01G 9/088* (2013.01)
USPC ............ 206/423; 206/560; 206/562; 206/565

(58) Field of Classification Search
CPC ....... A01G 9/1066; A01G 9/108; A47G 7/00; A47G 23/02; A47G 23/0208; B65D 71/50
USPC .......... 206/423, 521.7, 521.6, 562, 565, 560; 220/512, 507; 47/39
See application file for complete search history.

(56) References Cited

U.S. PATENT DOCUMENTS

| | | | |
|---|---|---|---|
| 3,690,453 A | 9/1972 | Dorall | |
| 3,825,126 A | 7/1974 | Pohl et al. | |
| 4,120,396 A * | 10/1978 | Mascia et al. | 206/151 |
| 4,756,119 A | 7/1988 | Chabot | |
| 4,793,097 A * | 12/1988 | Whitcomb | 47/86 |
| 5,630,293 A | 5/1997 | Hicks, Sr. | |
| 5,779,210 A | 7/1998 | Canson et al. | |
| 6,827,207 B1 * | 12/2004 | Chen | 206/162 |
| 7,828,196 B2 | 11/2010 | De Pagter et al. | |
| 2004/0251703 A1 | 12/2004 | Griffith et al. | |
| 2005/0072840 A1 | 4/2005 | Levin et al. | |
| 2010/0101143 A1 | 4/2010 | Fima et al. | |

* cited by examiner

*Primary Examiner* — Mickey Yu
*Assistant Examiner* — Allan Stevens
(74) *Attorney, Agent, or Firm* — Christopher G. Darrow; Young Basile Hanlon & MacFarlane P.C.

(57) ABSTRACT

Disclosed herein are embodiments of a carrier for organizing and transporting a plurality of horticultural containers. In one aspect, a carrier includes: a plurality of connected open ended container receiving receptacles each configured to carry a horticultural container by supporting an upper portion thereof; and at least one tab configured to engage a container received by one of the plurality of container receiving receptacles such that the carrier is at least partially suspended with respect to the container.

13 Claims, 6 Drawing Sheets

FLOWER POT CARRIER WITH SUSPENSION TAB

TECHNICAL FIELD

The embodiments disclosed herein generally relate to a carrier for transporting a plurality of horticultural containers.

BACKGROUND

Horticultural growing containers, such as flower pots, are commonly filled and seeded in mass quantities at nurseries during large scale plant propagation operations. At the beginning stages of propagation, the containers can be loaded into trays configured to hold and arrange multiple containers. The loaded trays can serve as an efficient means for organizing, filling and seeding the containers at the nursery, for transporting containers with grown plants to retail centers, and for ultimately displaying the plants to consumers. The trays can not only be utilized throughout the course of filling, planting, transportation and display of the containers, but can also, after being emptied of containers by retail consumers, be returned from the retail center to the nursery for re-use.

SUMMARY

Disclosed herein are embodiments of a carrier for organizing and transporting a plurality of horticultural containers. In one aspect, a carrier comprises: a plurality of connected open ended container receiving receptacles each configured to carry a horticultural container by supporting an upper portion thereof; and at least one tab configured to engage a container received by one of the plurality of container receiving receptacles such that the carrier is at least partially suspended with respect to the container.

In another aspect, a method of transporting one or more horticultural containers comprises: loading a horticultural container within a first of a plurality of open ended container receiving receptacles defined by a carrier and configured to carry the container by supporting an upper portion thereof; and at least partially suspending the carrier on the container by engaging a tab connected to the carrier with the container.

In another aspect, the carrier comprises: at least a first and second connected open ended container receiving receptacles diagonally opposed with respect to the carrier and each configured to carry a horticultural container by supporting an upper portion thereof; a first tab adjacent the first receptacle and configured to engage a first container received therein such that the carrier is at least partially suspended with respect to the second container; and a second tab adjacent the second receptacle and configured to engage a second container received therein such that the carrier is at least partially suspended with respect to the second container.

These and other aspects will be described in additional detail below.

BRIEF DESCRIPTION OF THE DRAWINGS

The various features, advantages and other uses of the present apparatus will become more apparent by referring to the following detailed description and drawing in which.

DETAILED DESCRIPTION

Disclosed herein are embodiments of a carrier for transporting a plurality of horticultural containers that uses requires less material to manufacture than a conventional tray, and that includes features for suspending the carrier from the horticultural containers to space the carrier from a ground surface.

Figure 1:
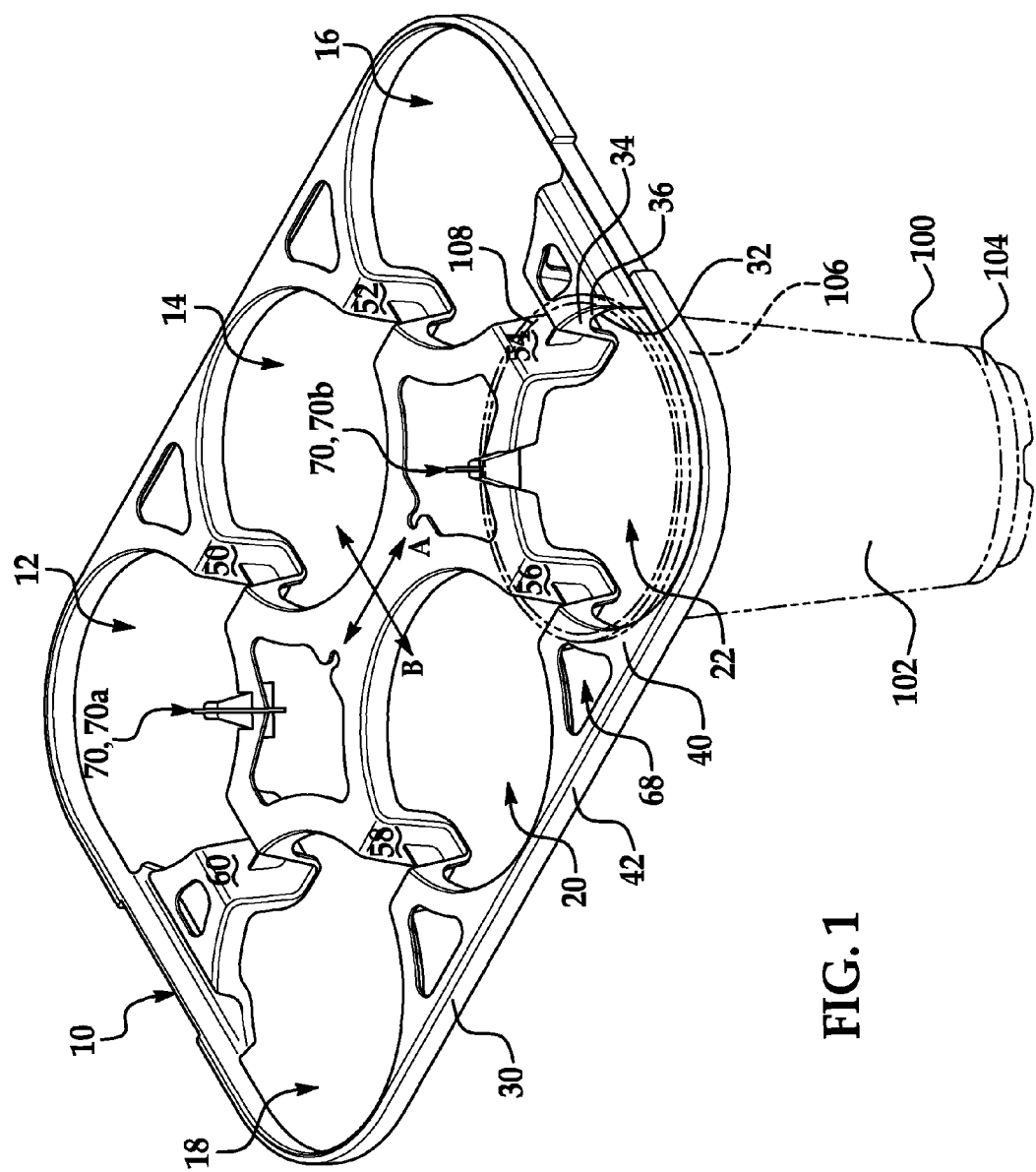
FIG. 1 is a perspective view of a carrier for transporting a plurality of horticultural containers.
Figure 2:
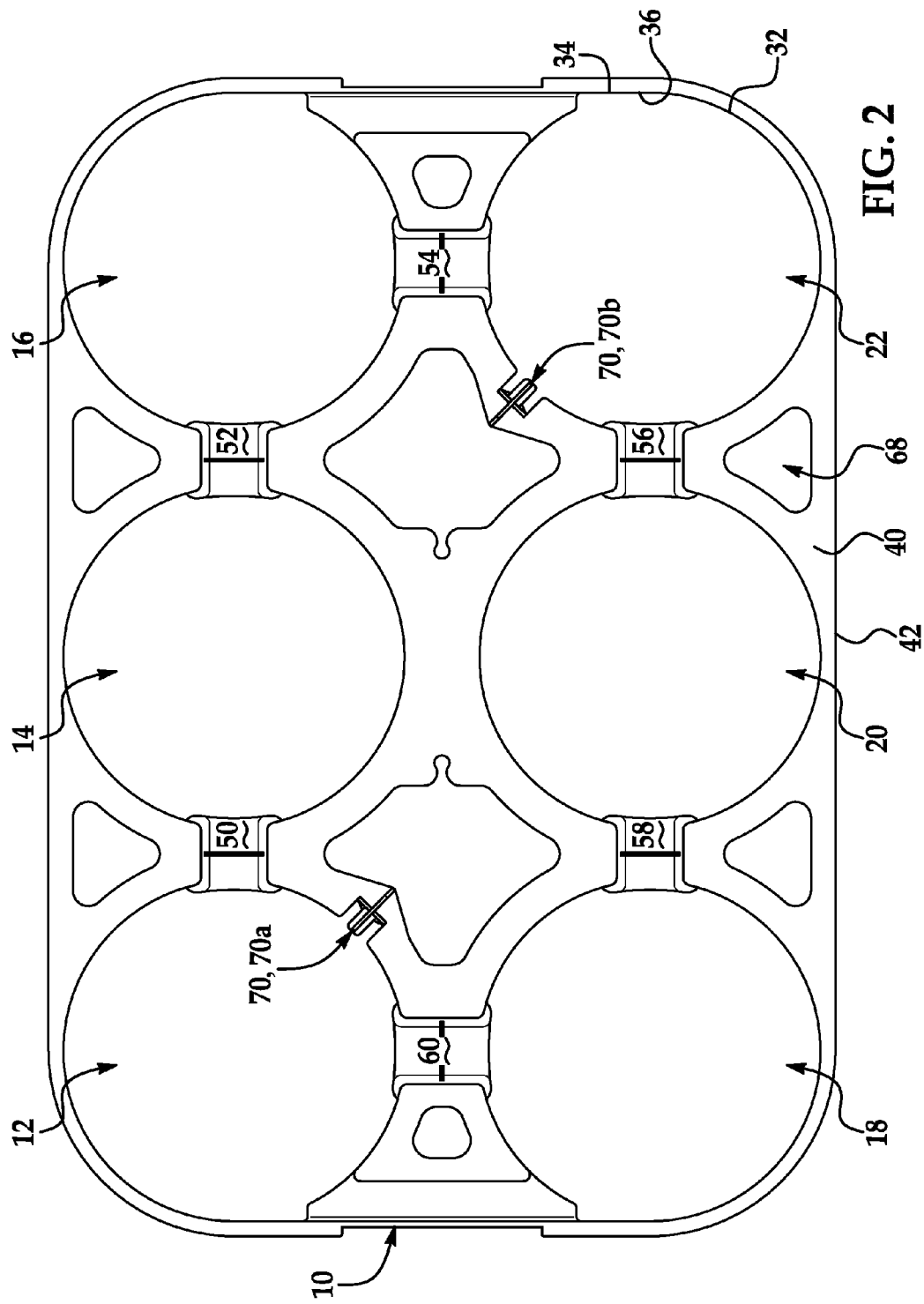
FIG. 2 is a top view of the carrier of FIG. 1.
Figure 3:
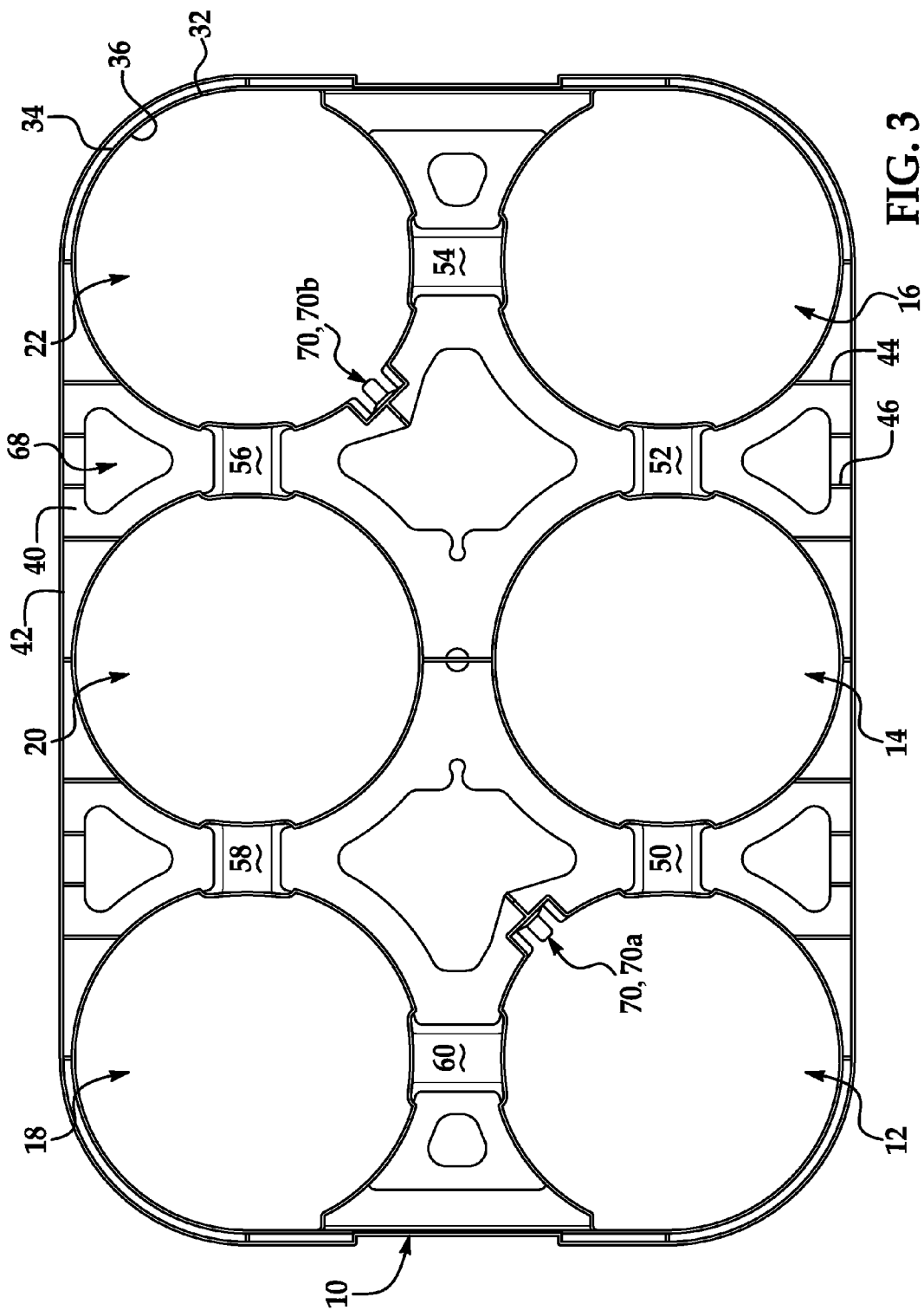
FIG. 3 is a bottom view of the carrier of FIG. 1.

Referring to FIGS. 1-3, a carrier 10 is generally composed of a plurality of substantially rigidly connected container receiving receptacles. The illustrated carrier 10 includes a first receptacle 12, a second receptacle 14, a third receptacle 16, a fourth receptacle 18, a fifth receptacle 20 and a sixth receptacle 22. The six receptacles 12, 14, 16, 18, 20 and 22 are arranged in a three-by-two array. As shown, the carrier 10 includes a first row of receptacles having the first receptacle 12, the second receptacle 14 and the third receptacle 16 aligned in a longitudinal direction A of the carrier 10, and includes a second row of receptacles having the fourth receptacle 18, the fifth receptacle 20 and the sixth receptacle 22 similarly aligned in the longitudinal direction A of the carrier 10. The first and second rows of receptacles are disposed side-by-side in a transverse direction B of the carrier 10, such that the carrier 10 has a generally rectangular outer profile 30. It will be understood that the illustrated carrier 10 is provided as a non-limiting example, and that the carrier 10 could include an alternative number and/or arrangement of receptacles.

Each of the six receptacles 12, 14, 16, 18, 20 and 22 is generally sized and configured for receiving and carrying a horticultural container 100, such as a flower pot, typically used for cultivation and transport of flowers or other plants. Such containers are commonly composed of polymeric materials, although the carrier 10 can be compatible with containers composed of other materials, such as wood or stone. The exemplary container 100 defines a hollow structure suitable for receiving fill material and one or more plants. The container 100 has an outwardly tapering upright side wall 102 extending between a generally closed bottom portion 104 and an open upper portion 106 opposite the bottom potion 104 that terminates at a radially protruding rim 108. The illustrated container 100 has a circular cross section, although the container 100 could alternatively have an oval, oblong or polygonal cross section, for example.

The six receptacles 12, 14, 16, 18, 20 and 22 are similarly constructed, although they may vary in position or orientation with respect to the carrier 10. With reference to the representative sixth receptacle 22, each of the receptacles is defined by a bottom edge 32, a top edge 34 opposite the bottom edge 32, and a slightly outwardly tapering and generally annular shaped upright side wall 36 extending between the bottom edge 32 and the top edge 34. The illustrated receptacle 22 has a substantially circular cross section corresponding to the cross section of the container 100, although the receptacle 22 could alternatively have an oval, oblong or polygonal cross section, for example.

The receptacle 22 is configured to carry the container 100 by supporting the container 100 at its upper portion 106. The receptacle 22 is generally sized larger than the bottom portion 104 of the container, and smaller than at least a part of upper portion 106. With the container 100 in its illustrated upright orientation, the container 100 can be loaded into the tray 10 by positioning the bottom portion 104 into the receptacle 22, and lowering the container 100 with respect to the receptacle 22 until the receptacle 22 circumscribes the upper portion 106 of the container 100.

With the container 100 in its illustrated fully received position, the container 100 is supported from downward movement, by force of gravity or otherwise, through interference with the receptacle 22. For instance, as shown, the side wall 36 defining the receptacle 22 collars the upper portion 106 of the container 100, and downward movement of the container 100 is prevented through interference between the side wall 36 and the slightly larger upper portion 106 of the container 100. Alternatively, the receptacle 22 could support the container 100 through engagement between the rim 108 of the container 100 and the top edge 34 of the receptacle 22. It will be understood that these are provided as non-limiting examples, and that the receptacle 22 and/or container 100 may include other cooperative features for supporting the container 100 from downward movement with respect to the receptacle 22. In addition, the same receptacle 100 can be configured to support multiple different sized or shaped containers 100, and therefore the position of a container 100 with respect to the receptacle 22 when fully received therein can vary from that specifically shown in FIG. 1.

When the carrier 10 is lifted and maintained in a generally horizontal orientation, the side wall 36 defining the receptacle 22 prevents the container 100 from achieving substantial amounts of lateral and/or rotational movement. In addition, the spatial relationship of the receptacle 22 with respect to upper portion 106 of the container 100, when the container 100 is fully received in the receptacle 22, can further inherently stabilize the container 100 from rotational movement. For instance, the container 100 can supported at its upper portion 106 such that the center of mass of the container 100 is near or below the receptacle 22. Even if the container 100 includes a plant that effectively shifts the center of mass of the container 100 to a point above the receptacle 22, the container 100 will still be relatively more stable than if it were held and supported from the bottom portion 104. The carrier 10 can therefore stably support the container 100, without the addition of lateral support structures typically provided in trays configured to hold and support the container 100 from the bottom portion 104. Thus, the carrier 10 may require less material and have a lower profile than a typical tray, and further may be manufacture and shipped in a more cost-effective manner.

In the illustrated example of the carrier 10, a nominal diameter of the receptacle 22 is approximately 5-6 inches, such that the receptacle 22 can receive and support a typical commercially available 2.5 quart container 100. A depth of the receptacle 22, that is, the height of the upright side wall 36 between the bottom edge 32 and the top edge 34, can be approximately 0.5 inches. With the other receptacles 12, 14, 16, 18 and 20 similarly sized, the carrier 10 can have an overall length in the longitudinal direction A of approximately 19 inches, and an overall width in the transverse direction B of approximately 13 inches.

The receptacle 22 terminates at the top edge 34, and similar top edges of the other receptacles 12, 14, 16, 18 and 20 included in the carrier 10 are oriented in a common plane and interconnected by a generally planar upper surface 40 of the carrier 10. The upper surface 40 of the carrier 10 generally extends between the receptacles 12, 14, 16, 18, 20 and 22 in the common plane, and terminates according to the generally rectangular outer profile 30 of the carrier 10.

The upper surface 40 of the carrier 10 can include an overturned rim 42 at its outer periphery for additional strength and rigidity. Referring specifically to FIG. 3, the carrier 10 can also optionally include a number of ribs 44, an example of which is shown extending between an inside of the overturned rim 42 of the upper surface 40 and the receptacle 16. In addition, the carrier 10 can optionally include a number of gussets 46, an example of which is shown extending between the inside of the overturned rim 42 and the upper surface 40.

The upper surface 40 of the carrier 10 can additionally define one or more U-shaped cross-channels connecting between laterally and/or transversely adjacent receptacles 12, 14, 16, 18, 20 or 22. The illustrated upper surface 40 of the carrier 10 includes six U-shaped cross-channels 50, 52, 54, 56, 58 and 60. As shown, a first U-shaped cross-channel 50 extends longitudinally between the first receptacle 12 and the second receptacle 14, a second U-shaped cross-channel 52 extends longitudinally between the second receptacle 14 and the third receptacle 16, a third U-shaped cross-channel 54 extends transversely between the third receptacle 16 and the sixth receptacle 22, a fourth U-shaped cross-channel 56 extends longitudinally between the sixth receptacle 22 and the fifth receptacle 20, a fifth U-shaped cross-channel 58 extends longitudinally between the fifth receptacle 20 and the fourth receptacle 18, and a sixth U-shaped cross-channel 60 extends transversely between the fourth receptacle 18 and the first receptacle 12. It can be seen that the U-shaped cross-channels 50, 52, 54, 56, 58 and 60 connecting between receptacles 12, 14, 16, 18, 20 or 22 as described above may form a portion of the respective substantially annular upright side walls 36.

In the illustrated example of the carrier 10, each of the U-shaped cross-channels 50, 52, 54, 56, 58 and 60 extend in a direction parallel to imaginary lines extending normally between radial axes of adjacent receptacles 12 and 14, adjacent receptacles 14 and 16, adjacent receptacles 16 and 22, adjacent receptacles 22 and 20, adjacent receptacles 20 and 18 and adjacent receptacles 18 and 12, respectively. As shown, the U-shaped cross-channels 50, 52, 54, 56, 58 and 60 extend along the respective imaginary lines, although one or more of the U-shaped cross-channels 50, 52, 54, 56, 58 and 60 could extend offset from respective the imaginary lines. The upper portions of the U-shaped cross-channels 50, 52, 54, 56, 58 and 60 are disposed at the upper surface 40 of the carrier 10, with vertexes extending downward beyond the bottom edges of the receptacles 12, 14, 16, 18, 20 and 22. It will be understood that the shape, size, number or orientation of the U-shaped cross-channels 50, 52, 54, 56, 58 and 60 can vary from that specifically illustrated and described according to strength, rigidity, aesthetic, cost or any other design criteria for the carrier 10, and could also vary with differences in the number and/or arrangement of the receptacles 12, 14, 16, 18, 20 and 22 included in the carrier 10.

As shown, the upper surface 40 of the carrier 10 can also include optional cutouts 68, an example of which is defined by the upper surface 40 between the fifth receptacle 20, the sixth receptacle 22, the U-shaped cross-channel 56 and the outer profile 30 of the carrier 10 at the upper surface 40. The cutout 68 can generally be provided to save weight and material cost during production of the carrier 10, but could also be provided for other reasons relating, for example, to functional or aesthetic considerations. The geometry of the illustrated cutouts 68 is such that the material of the upper surface 40 of the carrier 10 is removed except for material bordering each of the receptacles 12, 14, 16, 18, 20 and 22, U-shaped cross-channels 50, 52, 54, 56, 58 and 60, and the outer profile 30 of the carrier 10. The shape, size, number or orientation of the cutouts 68 can vary from that specifically illustrated and described according to strength, rigidity, aesthetic, cost or any other design criteria for the carrier 10, and could also vary with differences in the number and/or arrangement of the receptacles 12, 14, 16, 18, 20 and 22, and of the U-shaped cross-channels 50, 52, 54, 56, 58 and 60 included in the carrier 10.

Figure 4:
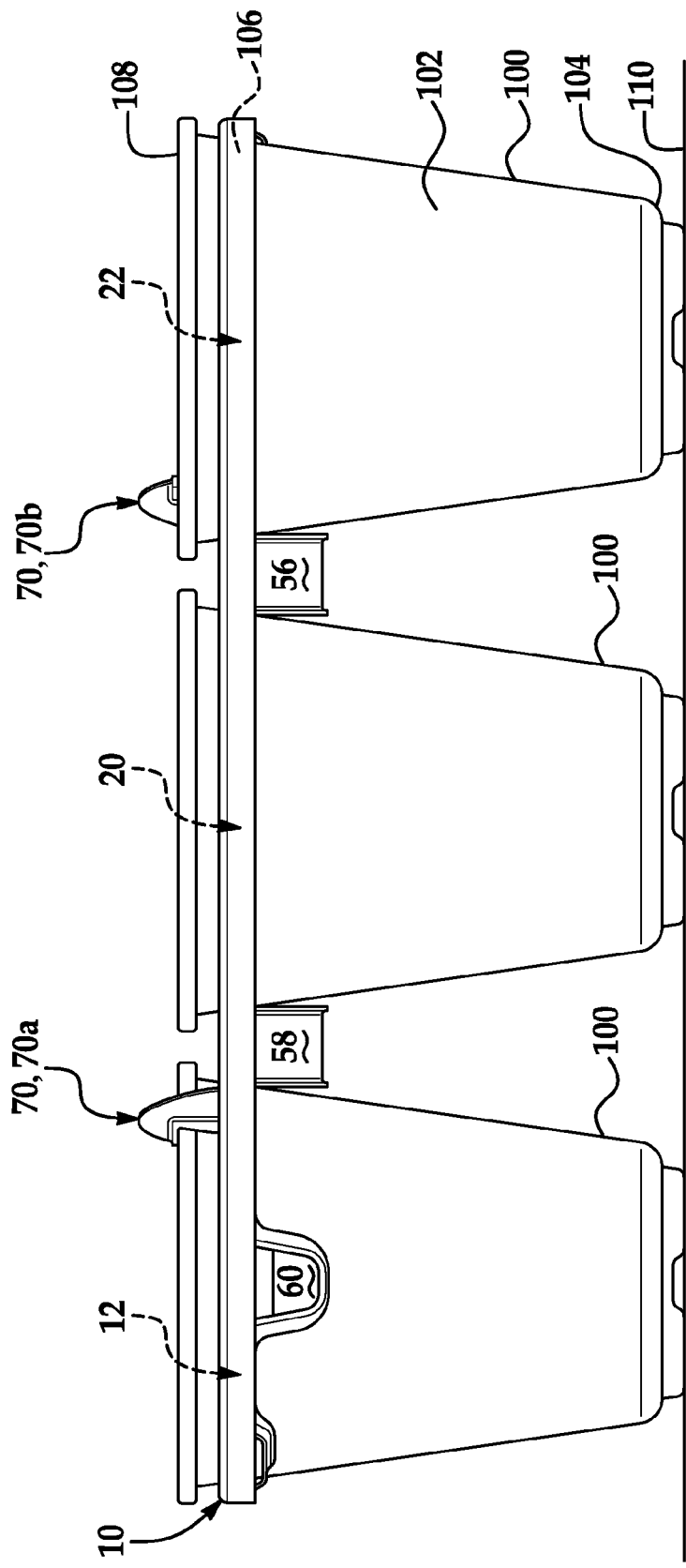
FIG. 4 is a side view of the carrier of FIG. 3 loaded with containers.

During large scale plant propagation operations, multiple carriers 10, each loaded with containers 100, can be closely packed together in order to organize the containers 100 for filling, seeding, transport and display. In FIG. 4, containers 100 are shown fully received within the receptacles 12, 14, 16, 20 and 22 (the receptacle 18 is empty for clarity) of the carrier 10 and resting on a ground surface 110. The illustrated carrier 10 includes features for maintaining the carrier 10 in an upward position, towards the upper portion 106 of the containers 100, when one or more of the receptacles 12, 14, 16, 18, 20 and 22 of the carrier 10 are loaded with containers 100. In this manner, the carrier 10 can be made easily accessible among the containers 100 that are loaded into the carrier 10, and in addition, a particular carrier 10 can be made easily accessible among other closely packed carriers 10. Thus, one advantage of the illustrated carrier 10 over conventional trays, which are configured to rest on a ground surface, is that the carrier 10 can be easily accessed for lifting and transport, even when the containers 100 include plants.

As shown, the carrier 10 includes one or more tab structures 70, which are each configured to at least partially suspend the carrier 10 with respect to one or more containers 100 received within the receptacles 12, 14, 16, 18, 20 and 22. The tab structures 70 are connected to the carrier 10 and configured to couple to one or more of the containers 100, in order to inhibit downward movement of the carrier 10 with respect to the containers 100 towards the ground surface 110. The carrier 10 preferably includes tab structures 70 connected to the carrier 10 on both opposing sides of a central longitudinal dividing line of the carrier 10, as well as tab structures 70 connected to the carrier 10 on both opposing sides of a central transverse dividing line of the carrier 10. Although number, position and/or orientation of tab structures 70 may vary from that specifically shown, the illustrated carrier 10, for example, includes two diagonally opposed tab structures 70a and 70b. The first tab structure 70a is connected to the carrier 10 at an upper (in the longitudinal direction A) right-hand (in the transverse direction B) portion of the carrier 10, adjacent the first receptacle 12, and the second tab structure 70b is connected to the carrier 10 at a lower left-hand portion of the carrier 10, adjacent the sixth receptacle 22.

Figure 5:
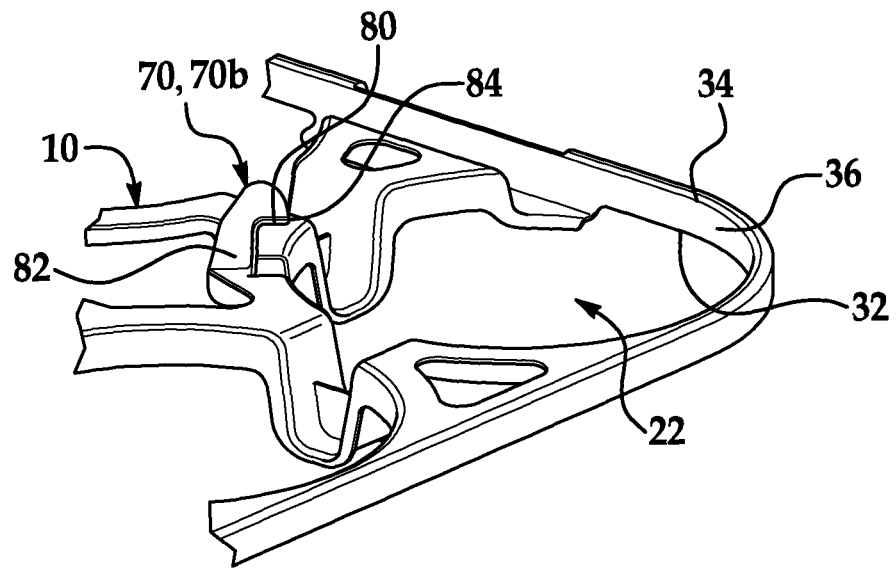
FIG. 5 is a detailed perspective view of the carrier of FIG. 1 showing details of a tab adjacent a container receiving receptacle.

The configuration of a representative tab structure 70b is explained with additional reference to FIG. 5. The tab structure 70b connects to the carrier 10 adjacent an inner periphery of the receptacle 22, that is, adjacent a portion of the receptacle facing towards the center of the carrier 10. As shown, the tab structure 70b supports a tab 80. The tab 80 may be or include any surface of the carrier 10, or any surface connected to the carrier 10, that can engage and couple to a container 100 and thereby inhibit downward movement of the carrier 10 with respect to the container 100 towards the ground surface 110.

The position and configuration of the tab 80 can depend upon the geometric and spatial relationships between the receptacle 22 and the container 100 during and/or after receipt of the container 100 within the receptacle 22. For instance, as shown, the rim 108 of a container 100 extends above the top edge 34 of the receptacle 22 when the container 100 is fully received, and into a space above and radially outward of the receptacle 22. Thus, as shown, the tab 80 extends horizontally atop the receptacle 22 into a space above and adjacent to the space occupied by the rim 108 of the container 100 when the container 100 is fully received within the receptacle 22, such that interference between the tab 80 and the rim 108 of the container 100 inhibits downward movement of the carrier 10 with respect to the container 100. It will be understood, however, that the illustrated tab 80 is provided as a non-limiting example, and that the tab 80 could be positioned and/or configured to otherwise engage the rim 108 or other parts of the upper portion 106 of the container 100 or a differently constructed container.

The tab 80 is shown in FIG. 5 in a closed position, where it is operable to engage a container 100 fully received within the receptacle 22. The tab 80 and the container 100 can be configured for mutual relative movement such that the tab 80 is removed from a space occupied by the container 100 during receipt into the receptacle 22. This can occur through movement of the tab 80, the container 100 or a combination thereof. For example, the tab 80 can be optionally be connected to the carrier 10 for movement between an open and closed position by an arm 82 projecting from the upper surface 40 of the carrier 10 and supporting the tab 80 atop the receptacle 22, as explained with additional reference to FIGS. 6A-6C.

Figure 6A:
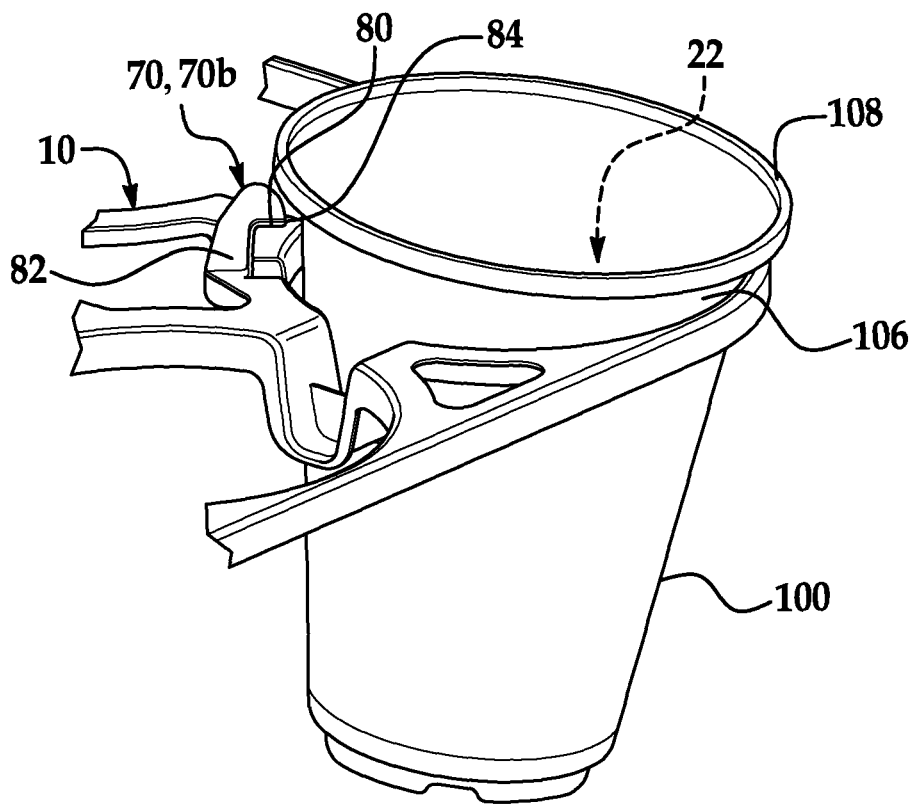
FIGS. 6A-6C are detailed perspective views showing details of engagement between the tab of FIG. 5 with a container loaded within the container receiving receptacle.
Figure 6B:
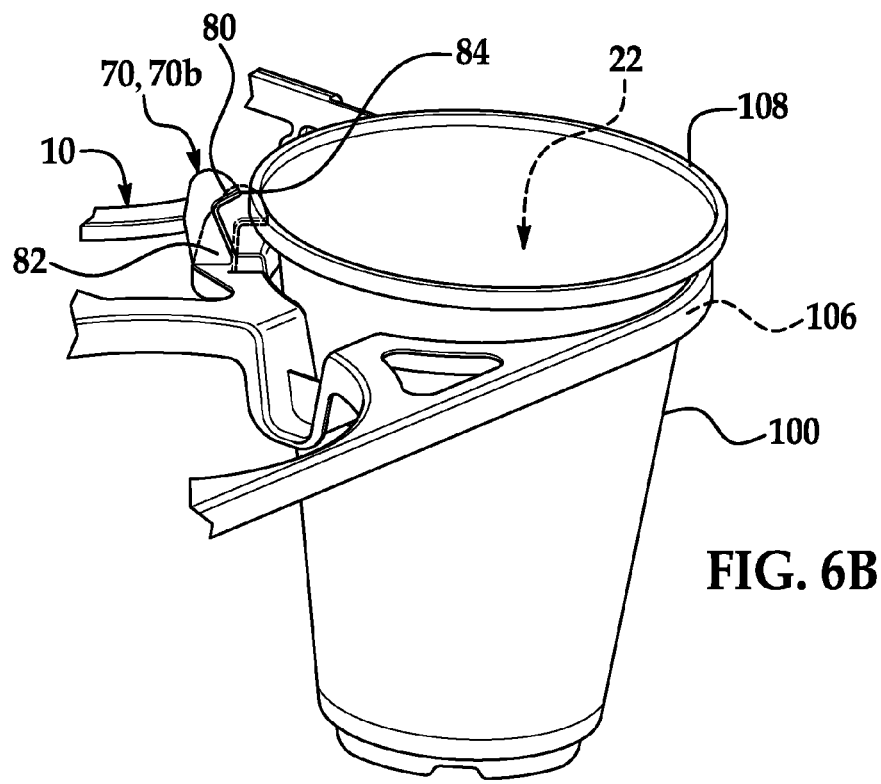
Figure 6C:
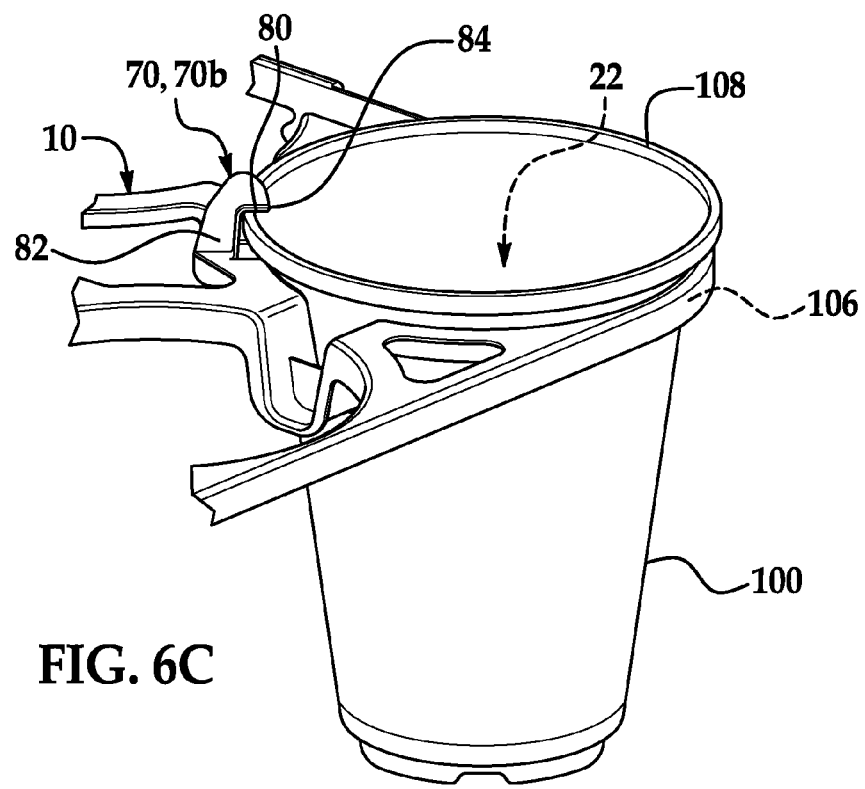

In FIG. 6A, the container 100 is shown in a partially received position within the receptacle 100, and the tab 80 is in the closed position. As shown if FIG. 6B, the tab 80 can be displaced to an open position, where the tab 80 is removed from a space occupied by the container 100 during positioning between the partially received position and its fully received position within the receptacle 22. Specifically, the tab 80 can be displaced though rotation of the arm 82, such that the rim 108 of the container 100 is cleared from a distal portion 84 of the tab 80. With the tab 80 in the open position, the container 100 is free to move into its fully received position within the receptacle 22, as shown in FIG. 6C. With the container 100 in the fully received position, the tab 80 can be returned to the closed position, where it is operable to engage and couple to the container 100, as explained above. In other examples, the tab 80 may be configured for less movement than illustrated, or the tab 80 could be stationary, and the container 100 could be configured to flex or otherwise change shape during receipt into the receptacle 22 in order to clear the tab 80.

The arm 82 and the tab 80 may be formed integrally with the carrier 10 through an injection molding process, for example, although the tab 80 could be otherwise formed with the carrier 10. The material of the carrier 10 can be selected such that the arm 82 supports the tab 80 with a bias toward the illustrated closed position, but such that the tab 80 can be displaced to the open position through rotation of the arm 80 with the application of force applied to the tab 80 via a container 100 that is being loaded into the receptacle 22, for example. For instance, the carrier 10 can be composed of a recyclable polymeric material suitable for injection molding, such as polypropylene, although the carrier 10 could be composed of alternative or additional materials.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A carrier for organizing and transporting a plurality of horticultural containers, comprising:
 a plurality of similarly sized open ended receptacles, the plurality of open ended receptacles being connected and each configured to carry a horticultural container by supporting an upper portion thereof, the carrier having a central longitudinal dividing line and a central transverse dividing line perpendicular to the longitudinal dividing line; and
 a plurality of tabs, each of the plurality of tabs associated with one of the plurality of open ended receptacles and configured to engage a container received therein, the plurality of tabs including tabs positioned on both sides of the central longitudinal dividing line and tabs positioned on both sides of the central transverse dividing line, wherein at least one of the plurality of open ended receptacles has no associated tab.

2. The carrier of claim 1, wherein each of the plurality of open ended receptacles is defined at least in part by side wall configured to collar the upper portion of a container received therein.

3. The carrier of claim 1, wherein at least one of the plurality of tabs is positioned atop one of the plurality of open ended receptacles and configured to engage a rim of a container received therein.

4. The carrier of claim 1, wherein at least one of the plurality of tabs is supported for movement between a closed position to engage a container received within one of the plurality of open ended receptacles, and an open position removed from a space occupied by the container during receipt into the one of the plurality of open ended receptacles.

5. The carrier of claim 4, further comprising:
 an arm member resiliently supporting the at least one of the plurality of tabs with a bias toward the closed position.

6. The carrier of claim 1, wherein at least one of the plurality of tabs is positioned adjacent a portion of one of the plurality of open ended receptacles facing towards a center of the carrier.

7. The carrier of claim 1, wherein the plurality of tabs includes a first tab positioned on a first side of the central longitudinal dividing line and on a first side of the central transverse dividing line, and a second tab diagonally opposed to the first tab and positioned on an opposite side of the central longitudinal dividing line and on an opposite side of the central transverse dividing line as the first tab.

8. The carrier of claim 1, further comprising:
 the plurality of open ended receptacles including adjacent first and second open ended receptacles each defined at least in part by respective upright side walls;
 an upper surface connecting top edges of the upright side walls of the first and second open ended receptacles; and
 a cross-channel defined by the upper surface and extending between the upright side walls of the first and second open ended receptacles.

9. The carrier of claim 1, further comprising:
 the plurality of open ended receptacles including six open ended receptacles arranged in a three-by-two array.

10. A carrier for organizing and transporting horticultural containers, comprising:
 six or more similarly sized open ended receptacles, the open ended receptacles being connected and each configured to carry a horticultural container by supporting an upper portion thereof, the carrier having a central longitudinal dividing line and a central transverse dividing line perpendicular to the central longitudinal dividing line; and
 a system for suspending the carrier with respect to containers received within the six or more open ended receptacles, the system consisting of:
  a first tab positioned to engage a container received within a first of the open ended receptacles positioned on a first side of the central longitudinal dividing line and on a first side of the central transverse dividing line, and
  a second tab positioned to engage a container received within a second of the open ended receptacles positioned on an opposite side of the central longitudinal dividing line and on an opposite side of the central transverse dividing line as the first of the open ended receptacles.

11. The carrier of claim 10, wherein the first tab is positioned atop the first of the open ended receptacles and configured to engage a rim of a container received therein, and the second tab is positioned atop the second of the open ended receptacles and configured to engage a rim of a container received therein.

12. The carrier of claim 10, wherein the first and second tabs are supported for movement between closed positions to engage a container received within respective of the first and second of the open ended receptacles, and open positions removed from spaces occupied by the containers during receipt into respective of the first and second of the open ended receptacles.

13. The carrier of claim 10, further comprising:
 the six or more open ended receptacles including two adjacent open ended receptacles each defined at least in part by respective upright side walls;
 an upper surface connecting top edges of the upright side walls of the two adjacent open ended receptacles; and
 a cross-channel defined by the upper surface and extending between the upright side walls of the two adjacent open ended receptacles.

* * * * *